Figure 1:
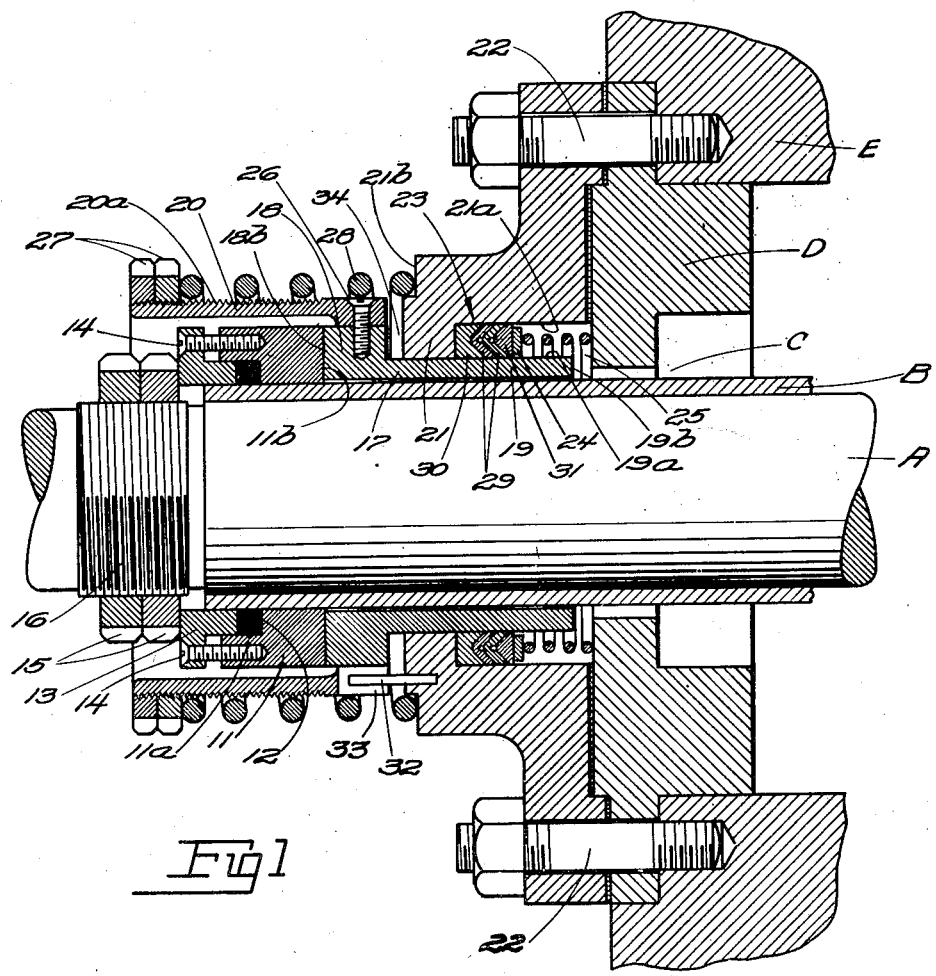

Sept. 11, 1951     H. F. GREINER     2,567,809

ADJUSTABLE ROTARY SEAL

Filed Sept. 17, 1947

INVENTOR
HAROLD F. GREINER
BY
Fraser, Myers & Manley
ATTORNEYS

Patented Sept. 11, 1951

2,567,809

UNITED STATES PATENT OFFICE 2,567,809

ADJUSTABLE ROTARY SEAL

Harold F. Greiner, Geneva, N. Y., assignor to The Garlock Packing Company, Palmyra, N. Y., a corporation of New York Application September 17, 1947, Serial No. 774,535

8 Claims. (Cl. 286—11.14)

This invention relates to sealing devices for preventing the escape of fluid, usually under pressure, from a machine casing such as a pump casing, along a shaft extending into or through an opening in said casing. More particularly the invention relates to so-called rotary sealing devices wherein the seal between relatively rotating parts is effective between coacting radial (usually plane) surfaces thereof.

In such rotary seals heretofore developed the force holding the mentioned radial sealing surfaces together has been derived from springs or from the force of springs modified by the pressure of the sealed fluid. If only springs were employed, there was no adequate provision for varying the force of the spring for variations in the fluid pressure with the result that the springs were tensioned sufficiently to hold sealing elements in working relationship against the highest pressures which would be encountered. This resulted in excessive friction, wear and wastage of power when normal or average pressures were present. Also, if very high pressures were anticipated, large and cumbersome springs were required.

Where the pressure of the sealed fluid was employed to hold or aid in holding the radial sealing surfaces together, no adequate means were provided for regulating, with any degree of precision, the force at which said sealing surfaces were held together. Thus, in most instances the sealing elements were overstressed with consequent excessive friction and wear and wastage of power.

Although, in rotary seals, the principal sealing effect is between radial sealing surfaces of relatively rotatable parts, as just outlined, sealing means also are usually provided against axial movement of the sealed fluid between relatively movable parts as, for example, to maintain a sealing effect between the casing and the shaft in the presence of end play of the latter. In some prior devices, a rather conventional packing and gland arrangement has been employed for this purpose with the packing directly engaging the shaft. However, due to this direct engagement of the packing with the rotating shaft and to the excessive compression ordinarily imposed upon such packing, the latter, in such prior structures, was subject to excessive friction with resultant excessive wear and wastage of power.

An object of the present invention is the provision of a rotary seal wherein the force of interengagement of radial sealing faces of sealing elements may be precisely adjusted to only a slightly greater force than that required to maintain an effective seal against the pressure of the fluid being sealed.

Another object is the provision of adjusting means as mentioned in the preceding paragraph, which means are readily accessible at the exterior of the machine or pump casing to effect readjustment of said means to adapt the device for most efficiently sealing the fluid under changed pressure conditions.

Another object is the provision of a rotary seal with improved means for effecting a seal between relatively axially movable parts without subjecting the device to excessive friction and wear and without involving wastage of power.

Figure 2:
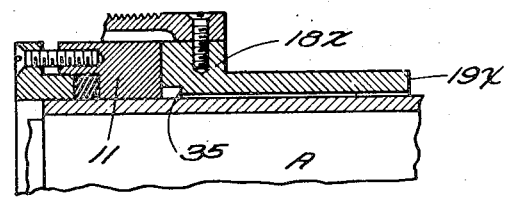

The foregoing and other objects and advantages are derived from the present invention of which, for illustrative purposes, several embodiments are illustrated in the drawing, wherein Figure 1 is a substantially central axial sectional view of a sealing device according to the present invention associated with a pump impeller shaft which extends through an opening in a portion of a pump casing, and Fig. 2 is a fragmentary central axial view of a modified form of the sealing device.

Referring first to Fig. 1, a rotatable shaft A, with a sleeve B tightly fixed thereon and constrained to rotate therewith, extends through an opening C in a cover plate D which is fixed to a machine casing E and to all intents and purposes a part of the latter. It may be considered that the machine casing defines a pressure chamber such as, for example, a chamber of a pump having an impeller (not shown) which may be fixed upon the inner or right end of the shaft A. Fluid under pressure within the casing E would tend to escape axially leftwardly along the shaft A as viewed in the drawing and in a general sense it is to the efficient prevention of such escape that the present invention is directed.

As disclosed herein, a sealing device according to this invention has certain parts, hereinafter sometimes called rotatable parts, which are directly associated with the shaft A and substantially constrained to rotate therewith and certain other parts, hereinafter sometimes called non-rotatable parts, which are more or less directly associated with the machine casing E and substantially restrained against rotation with the shaft. From the following description it will be understood that some rotation of the rotatable parts relatively to the shaft or of the non-rotatable parts relatively to the casing would not materially impair the effectiveness of the device.

The rotatable parts of the sealing device may comprise a selection of various means associated with the shaft A having a radial sealing face to coact with the non-rotatable parts. In the illustrated embodiments the rotatable parts comprise a relatively rigid sealing ring 11, of a suitable metal, or graphite composition, or other suitable material, closely but slidably fitted upon the sleeve B, a relatively soft packing ring 12, of rubber or rubber-like material or other suitable pliant material, compressed within an annular gland recess 11a of the sealing ring by a rigid gland ring 13 tightened by a plurality of circumferentially arranged screws 14. The possible leftward sliding movement of the foregoing rotatable parts is limited by a pair of locknuts 15 adjustable upon a threaded portion 16 of the shaft.

The packing ring 12 effectively prevents passage of fluid either leftwardly between it and the shaft or between it and the sealing ring 11, and its relatively tight frictional engagement with the shaft and with rings 11 and 13 substantially constrains the latter to rotate with the shaft; therefore the packing ring 12 is subject to only a relatively negligible degree of wear.

The non-rotatable parts of the sealing device, as illustrated, comprise a relatively rigid, annular sealing element 17 extending about and clear of the shaft, and having a radial sealing portion 18 with a radial sealing surface 18b coacting to effect a running seal with a radial sealing surface 11b of the ring 11, a cylindrical gland portion 19, and an adjustment sleeve 20.

A gland cap 21, fixed to the machine casing E by bolts 22 and surrounding the gland portion 19 of the non-rotatable sealing element is formed with an interior annular recess 21a within which is disposed a relatively soft packing 23 which is substantially closed into said recess by a washer 24; and a compressed coil spring 25 seats upon the cover plate D and upon said washer to yieldingly compress the packing into effective sealing engagement with the walls of the recess 21a and a cylindrical sealing surface 19a of the gland portion 19.

The sealing element 17, if desired, may be formed in one piece including its sealing portion 18, its gland portion 19 and its adjustment sleeve 20; but for convenience in manufacture the adjustment sleeve 20 may be formed separately and integrated with the remainder of the said sealing element by plural machine screws 26.

The adjustment sleeve 20 is exteriorly threaded adjacent its outer or free margin as at 20a to receive adjustable locknuts 27 between which and a shoulder 21b of the gland cap is compressed a coil spring 28 which surrounds the adjustment sleeve and urges the latter leftwardly to assure a running engagement of the sealing surfaces 11b and 18b.

Although the packing 23 may be of any suitable soft material, nevertheless, it may advantageously comprise at least one but preferably two or more packing rings 29 of substantially V shape in radial section, arranged with the angle of the V facing axially rightwardly, i. e., in the direction from which the pressure of the contained fluid is operative. These rings are nested within themselves and between rigid adapter rings 30, 31 the opposed radial surfaces of which are complementally shaped to support the packing rings in a preferred angularity with their outer peripheries effecting a sealing engagement with the cylindrical surface of the recess 21a of the gland cap and their inner peripheries effecting a sliding sealing engagement with the outer cylindrical surface 19a of the gland portion of the stationary sealing element.

Inasmuch as the adapter ring 31 does not ordinarily function as a seal against leftward movement of the contained fluid, the pressure of the latter, because of the angularity of the packing rings, becomes effective to urge and hold the inner and outer peripheries of the latter in effective sealing engagement with the related cylindrical surfaces of the gland portion 19 and the gland cap 21. Thus a relatively light compression of the spring 25 may suffice for normally holding the packing rings 29 in their sealing condition, and the force of the fluid pressure upon the said packing rings increases their sealing capacity substantially proportionately to the pressure of the contained fluid. In this way, overcompression of the packing rings is avoided thereby affording the greatest possible freedom of slidability of the gland portion 19 within the gland while nevertheless fully preserving the sealing effectiveness thereof. The compressive force of the spring 25 is not critical, hence a spring of proper characteristics may easily be selected without the need for any adjusting means therefor.

The sealing element 17 preferably is positively restrained against rotation by a pin 32, one end of which is fixed into the gland cap 21 and its free end extends slidably into a slot 33 formed in the sealing portion 18 of said sealing element.

The device preferably is installed in a machine substantially as shown in the drawing with the locknuts 15 adjusted to such position upon the threaded portion 16 of the shaft that a clearance 34 normally exists between the gland cap 21 and the radial sealing portion 18 of the stationary sealing element to permit the latter to move rightwardly with the sealing ring 11 and the shaft A in the presence of any rightward end play of the latter. In the presence of leftward end play of the shaft, the sealing element 17 follows the sealing ring 11 leftwardly to maintain an effective sealing coaction therewith. The relatively light compression under which the V-shaped packing rings coact with the gland portion 19 of the stationary sealing element, assures that the latter may slide freely within the gland in the presence of the described end play of the shaft.

The locknuts 27, preferably, are adjusted to such position upon the threaded portion 20a of the adjustment sleeve 20 that the spring 28 is compressed only slightly more than necessary to enable it, with the aid of the pressure of the contained fluid upon the end face 19b of the gland portion 19 of the stationary sealing element, to prevent the escape of fluid between the radial sealing faces 11b and 18b at the pressure normally to be developed in the fluid in the particular machine with which the sealing device is employed. If the developed pressure were to increase or decrease in operation, the increased or decreased force of the pressure upon the face 19b would substantially compensate for the pressure change, thereby avoiding any excessive friction upon the rings 11 and 17 in operation.

Because of the described relatively fine adjustment of the coaction of the sealing rings 11 and 17, the wear of the latter is reduced to a minimum. In practice the sealing portion 18 of the sealing element 17 may advantageously be somewhat more wear resistant than the ring 11. The latter ring, then, will suffer the most wear, but as it is easily accessible it may be readily replaced as necessary without disturbing the nonrotatable parts of the device.

If desired, the sealing element may be designed to be less responsive to the pressure of the contained fluid by annularly recessing the inner periphery of the sealing portion 18x of the said element as shown at 35 in Fig. 2. This provides, on said element, a radial face which will receive pressure from the contained fluid, opposing and diminishing the effect of pressure upon the end surface 19x. Obviously also, the recess 35, if desired, may be so proportioned as to provide a sufficiently large radial surface to fully balance or even overbalance the surface 19x. Under any of the variations described in this paragraph, the spring 28 should be somewhat stronger than would be needed in the structure as shown in Fig. 1. The structure according to Fig. 1 may be preferred if substantial pressure variations are anticipated in operation. On the other hand, if little or no pressure variations in operation are anticipated, the structure of Fig. 2 may be preferred.

It is noteworthy that the locknuts 15 and 27 are accessible for quick adjustment of the device upon installation or for easy readjustment if necessary.

It should be apparent that the present inventive concept may be embodied in various other structural arrangements without departing from the invention as defined in the accompanying claims.

What I claim is:

1. A sealing device for sealing a space between two relatively rotatable machine elements, comprising a sealing ring having a radial sealing surface effecting a running seal with a radial sealing surface associated with one of said machine elements, and another sealing surface for effecting a seal relatively to the other machine element; means yieldably urging said sealing ring axially to maintain said running seal effect; and single adjusting means, carried by said sealing ring and effective at plural points therearound for varying the urging force of said urging means, the said device further comprising a second sealing ring, slidably and sealingly associated with said one machine element, on which second sealing ring the mentioned sealing surface associated with the latter element is located; and coaxial means on said one machine element and adjustable axially relatively thereto, for limiting the axial shifting of the second sealing ring relatively to the said one machine element in the direction of the mentioned urging of the first sealing ring, the said limiting means being effective at plural points around said second sealing ring.

2. A sealing device for sealing a space between two relatively rotatable machine elements, comprising a sealing ring having a radial sealing surface effecting a running seal with a radial sealing surface associated with one of said machine elements, and another sealing surface for effecting a seal relatively to the other machine element; means yieldably urging said sealing ring axially to maintain said running seal effect; and single adjusting means, carried by said sealing ring and effective at plural points therearound for varying the urging force of said urging means, the said device further comprising a second sealing ring, slidably and sealingly associated with said one machine element, on which second sealing ring the mentioned sealing surface associated with the latter element is located; and a coaxial nut threaded to said one machine element for axial adjustment relatively thereto, for limiting the axial shifting of the second sealing ring relatively to the said one machine element in the direction of the mentioned urging the first sealing ring.

3. A sealing device for sealing a space between a substantially stationary machine casing and a rotatable shaft extending into an opening therein, comprising a sealing ring having a radial sealing surface effecting a running seal with a radial sealing surface associated with said shaft, and a cylindrical sealing surface for effecting a seal relatively to the casing; means yieldably urging said sealing ring axially to maintain said running seal effect; and adjusting means, carried by said sealing ring for varying the urging force of said urging means, the said adjusting means being disposed exteriorly of said space in position for manual adjustment thereof while the device is in its assembled condition the said adjusting means comprising a coaxial sleeve on said sealing ring and a nut threaded upon said sleeve for axial adjustment relatively thereto; and the said urging means comprising a spring encircling said sleeve and compressed between said nut and a portion of the casing.

4. A sealing device for sealing a space between a substantially stationary machine casing and a rotatable shaft extending into an opening therein, comprising a sealing ring having a radial sealing surface effecting a running seal with a radial sealing surface associated with said shaft, and a cylindrical sealing surface for effecting a seal relatively to the casing; means yieldably urging said sealing ring axially to maintain said running seal effect; and adjusting means, carried by said sealing ring for varying the urging force of said urging means, the said adjusting means being disposed exteriorly of said space in position for manual adjustment thereof while the device is in its assembled condition the said adjusting means comprising a coaxial sleeve on said sealing ring and a nut threaded upon said sleeve for axial adjustment relatively thereto; and the said urging means comprising a spring encircling said sleeve and compressed between said nut and a portion of the casing; the device including also a second sealing ring slidably sealingly mounted upon said shaft, on which second sealing ring the mentioned sealing surface associated with the shaft is located; and a nut threaded upon said shaft for axial adjustment relatively thereto, for limiting the axial shifting of the second sealing ring relatively to the shaft in the direction of the mentioned urging of the first sealing ring.

5. A sealing device for sealing a space between a substantially stationary machine casing and a rotatable shaft extending into an opening therein, comprising a gland portion of the casing extending about said shaft in spaced relation thereto and having an inner annular packing recess with a radial surface and a cylindrical surface; a first sealing ring fluid-tightly and axially-slidably mounted upon said shaft in normally axially spaced relationship to said gland portion of the casing; an abutment element threaded to said shaft for adjustment axially thereof and adapted to limit axial movement of said sealing ring in a direction away from the said gland portion; a second sealing ring having an intermediate radial portion extending between the first sealing ring, normally in running sealing engagement therewith at radial sealing surfaces of said rings, and said gland portion, normally with a substantial clearance between it and the latter, a coaxial adjustment sleeve extending from said intermediate portion and about and clear of said first sealing ring with an adjustment nut threaded upon the exterior of said sleeve, and a gland sleeve extending from said intermediate portion and within the space between said gland portion of the casing and said shaft, substantially free of the latter with an outer cylindrical surface of said gland sleeve radially spaced inwardly of and opposed to the cylindrical surface of the gland portion of the casing; a spring encircling said adjustment sleeve and compressed between said adjustment nut and said casing; packing within said packing recess; and a spring compressed axially between said packing and said casing to maintain the packing in sealing association with the two said cylindrical surfaces.

6. A sealing device for sealing a space between a substantially stationary machine casing and a rotatable shaft extending into an opening therein, comprising a sealing element having a radial sealing portion, exteriorly of said casing, with a radial sealing surface of said sealing portion effecting a running seal with a radial surface associated with said shaft, a gland sleeve integral with said radial sealing portion and extending axially inwardly substantially within said space in close sliding relation to said shaft and said casing and having an outer cylindrical sealing surface with sealing means between the latter surface and a surrounding inner cylindrical surface associated with the machine casing, an annular adjustment portion integral with said radial sealing portion at the latter's outer periphery and axially outward of the machine casing, an adjusting abutment on said adjustment portion and adjustable axially of the latter, and a resilient member compressed between said abutment and the machine casing for urging said sealing element axially to maintain the running seal coaction between the two mentioned radial sealing surfaces, the said device further comprising a sealing ring slidably and sealingly associated with the shaft and providing the mentioned radial sealing surface associated with the shaft; and a nut on the shaft at the outer end of said sealing ring for axially adjusting the position of the latter; the said adjustment portion of the sealing element comprising a sleeve extending about said sealing ring in spaced relation thereto, the said abutment comprising a nut threaded upon the said adjustment sleeve, and both said nuts being readily accessible for manual adjustment thereof while the device is in its fully assembled operating condition.

7. A sealing device for sealing a space between a substantially stationary machine casing and a rotatable shaft extending into an opening therein, comprising a sealing ring having a radial sealing surface for effecting a running seal with a radial sealing surface associated with the shaft, and a cylindrical sealing surface for effecting a seal relatively to the casing; an adjusting element, carried upon said sealing ring and adapted for axial adjustment relatively thereto; and a coil spring coaxially disposed relatively to said sealing ring and coacting therewith and with the casing for yieldably urging said sealing ring axially to maintain said running seal effect; said adjusting element being adjustable axially along said sealing ring to vary the force of the spring imposed upon the sealing ring.

8. A sealing device for sealing a space between a machine casing and a shaft extending into an opening in the casing which casing and shaft are relatively rotatable; the said device comprising a gland portion of the casing extending about said shaft in spaced relation thereto and having an annular packing recess with a radial surface and a cylindrical surface; a sealing ring having a radial sealing surface for effecting a running seal with a radial sealing surface associated with the shaft and a gland sleeve extending within the space between said gland portion and the shaft with a cylindrical surface of the sleeve spaced radially from the cylindrical surface of the gland portion; an adjusting nut threaded coaxially upon said sealing ring; a spring coaxially disposed relatively to said sealing ring and coacting with said nut to yieldably urge the sealing ring axially to maintain said running seal effect; annular packing within said packing recess between the two mentioned cylindrical surfaces; and a spring coaxially disposed relatively to said packing and coacting with the latter to urge it toward the radial surface of the packing recess and to maintain the packing in sealing association with the two mentioned cylindrical surfaces.

HAROLD F. GREINER.

REFERENCES CITED

The following references are of record in the file of this patent:

UNITED STATES PATENTS

| Number | Name | Date |
|---|---|---|
| 1,814,704 | Joyce | July 14, 1931 |
| 2,220,771 | McHugh | Nov. 5, 1940 |
| 2,265,953 | Mortensen et al. | Dec. 9, 1941 |
| 2,403,314 | Jacobsen | Sept. 24, 1946 |
| 2,420,557 | Mueller | May 13, 1947 |

FOREIGN PATENTS

| Number | Country | Date |
|---|---|---|
| 503,149 | Great Britain | of 1939 |